United States Patent
Lindoff et al.

(10) Patent No.: US 7,437,175 B2
(45) Date of Patent: Oct. 14, 2008

(54) SYNCHRONIZATION DETECTION METHODS AND APPARATUS

(75) Inventors: Bengt Lindoff, Bjärred (SE); Bo Bernhardsson, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 763 days.

(21) Appl. No.: 10/839,926

(22) Filed: May 6, 2004

(65) Prior Publication Data

US 2005/0250526 A1   Nov. 10, 2005

(51) Int. Cl.
H04B 7/00 (2006.01)
H04Q 7/20 (2006.01)

(52) U.S. Cl. ............ 455/522; 455/69; 455/70; 455/574; 455/127.1; 455/127.5; 370/311; 370/318; 370/335

(58) Field of Classification Search ........ 455/436–442, 455/522, 501, 502, 67.11, 68–70, 574, 127.1–5; 370/342, 350, 311, 318, 331–337; 375/141, 375/297

See application file for complete search history.

(56) References Cited

U.S. PATENT DOCUMENTS

| | | | |
|---|---|---|---|
| 5,305,349 A | | 4/1994 | Dent |
| 6,236,865 B1 * | | 5/2001 | Lu ............... 455/522 |
| 6,343,218 B1 * | | 1/2002 | Kaneda et al. ........ 455/522 |
| 6,363,104 B1 | | 3/2002 | Bottomley |
| 6,594,499 B1 | | 7/2003 | Andersson et al. |
| 6,628,956 B2 | | 9/2003 | Bark et al. |
| 6,691,273 B2 | | 2/2004 | Wager et al. |
| 6,801,565 B1 | | 10/2004 | Bottomley et al. |
| 6,804,512 B1 * | | 10/2004 | Baker et al. ........ 455/423 |
| 6,928,296 B2 | | 8/2005 | Kanemoto et al. |
| 6,934,268 B1 * | | 8/2005 | Hedlund et al. ........ 370/311 |
| 7,079,858 B2 * | | 7/2006 | Baker et al. ........ 455/522 |
| 7,177,658 B2 * | | 2/2007 | Willenegger et al. ........ 455/522 |
| 7,184,791 B2 * | | 2/2007 | Nilsson et al. ........ 455/522 |
| 7,206,596 B2 * | | 4/2007 | Nishio ........ 455/522 |
| 2001/0028677 A1 | | 10/2001 | Wang et al. |
| 2004/0005906 A1 | | 1/2004 | Okumura et al. |
| 2004/0038698 A1 | | 2/2004 | Muller et al. |
| 2004/0058700 A1 | | 3/2004 | Nilsson et al. |
| 2004/0114555 A1 | | 6/2004 | Hayashi et al. |
| 2004/0160914 A1 | | 8/2004 | Sarkar |
| 2004/0162083 A1 | | 8/2004 | Chen et al. |
| 2004/0166884 A1 * | | 8/2004 | Oh et al. ........ 455/522 |
| 2005/0249149 A1 | | 11/2005 | Katsuri et al. |

FOREIGN PATENT DOCUMENTS

EP   0682417 A2   11/1995

(Continued)

OTHER PUBLICATIONS

U.S. Appl. No. 60/519,261, Not Published, Wilhelmsson.

(Continued)

Primary Examiner—Tuan A. Tran
(74) Attorney, Agent, or Firm—Potomac Patent Group PLLC

(57) ABSTRACT

Methods and apparatus for determining when uplink synchronization has been achieved when entering or adding a link in soft handover to a new node in a communication system. Transmit power control (TPC) commands from the new link are not included in a TPC command combination until an uplink synchronization detector determines that synchronization has been achieved. Since in many communication systems, a pattern of TPC commands is transmitted on the new downlink as long as the new node's uplink is not synchronized, the uplink synchronization detector can determine whether synchronization has been achieved by determining whether the TPC command pattern is present in the new downlink. In this way, the UL synchronization detector reduces the occurrence and magnitude of unwanted peaks and dips in uplink transmitted power.

23 Claims, 6 Drawing Sheets

FOREIGN PATENT DOCUMENTS

| | | |
|---|---|---|
| EP | 1 011 211 A1 | 6/2000 |
| EP | 1233541 A2 | 8/2002 |
| EP | 1 317 078 A2 | 6/2003 |
| WO | 00/76084 A1 | 12/2000 |

OTHER PUBLICATIONS

U.S. Appl. No. 10/700,855, Not Published, Nilsson et al.

U.S. Appl. No. 10/840,518, Not Published, Nilsson et al.

3GPP Technical Specification 25.214 (V5.6.0) Rel. 5, Contents, pp. 3-5, Sep. 2003.

3GPP Technical Specification 25.214 (V5.6.0) Rel. 5, Section 5.1, pp. 13-23, Sep. 2003.

3GPP Technical Specification 25.214 (V5.6.0) Rel. 5, Annex B, pp. 58-59, Sep. 2003.

Turin, G., "Introduction to Spread-Spectrum Antimultipath Techniques and Their Application to Urban Digital Radio", Proc. IEEE, Mar. 1980, pp. 328-353, vol. 68, IEEE.

Wiberg, N., et al., "Combining of Power Control Commands During Soft Handover in WCDMA", Proc. 14th Int'l Symposium on Personal, Indoor and Mobile Radio Communications (PIMRC), Sep. 2003, pp. 1-5, IEEE.

"Minimum Requirements for TPC Combining in Soft Handover", T-Doc R4-040162, Feb. 9-13, 2004, pp. 1-4, 3GPP.

\* cited by examiner

SYNCHRONIZATION DETECTION METHODS AND APPARATUS

BACKGROUND

This invention relates to transmitter-receiver synchronization detection in communication systems and more particularly to detection of synchronization of terminals in radiotelephone systems.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focusses on WCDMA systems for simplicity, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (terminals or users), respectively, in the downlink (base-to-terminal) direction. Since all users share the same radio resource in CDMA systems, it is important that each physical channel does not use more power than necessary. This is achieved by a transmit power control (TPC) mechanism, in which, among other things, base stations send TPC commands to users. The TPC commands cause the users to increase or decrease their transmitted power levels by increments, thereby maintaining target signal-to-interference ratios (SIRs) for the dedicated physical channels (DPCHs) between the base stations and the users. WCDMA terminology is used here, but it will be appreciated that other systems have corresponding terminology. Scrambling and channelization codes and transmit power control are well known in the art.

FIG. 1 depicts a mobile radio cellular telecommunication system 10, which may be, for example, a CDMA or a WCDMA communication system. Radio network controllers (RNCs) 12, 14 control various radio network functions including for example radio access bearer setup, diversity handover, etc. More generally, each RNC directs mobile station (MS), or remote terminal, calls via the appropriate base station(s) (BSs), which communicate with each other through downlink (i.e., base-to-mobile or forward) and uplink (i.e., mobile-to-base or reverse) channels. RNC 12 is shown coupled to BSs 16, 18, 20, and RNC 14 is shown coupled to BSs 22, 24, 26. Each BS serves a geographical area that can be divided into one or more cell(s). BS 26 is shown as having five antenna sectors S1-S5, which can be said to make up the cell of the BS 26. The BSs are coupled to their corresponding RNCs by dedicated telephone lines, optical fiber links, microwave links, etc. Both RNCs 12, 14 are connected with external networks such as the public switched telephone network (PSTN), the Internet, etc. through one or more core network nodes like a mobile switching center (not shown) and/or a packet radio service node (not shown).

As user terminals move with respect to the base stations, and possibly vice versa, on-going connections are maintained through a process of hand-off or handover. For example in a cellular telephone system, as a user moves from one cell to another, the user's connection is handed over from one base station to another. Early communication systems used hard handovers, in which a first cell's base station (covering the cell that the user was leaving) would stop communicating with the user just as the second base station (covering the cell that the user was entering) started communication. Modern systems typically use soft handovers, in which a user is connected simultaneously to two or more base stations. In FIG. 1, MSs 28, 30 are shown communicating with plural base stations in diversity handover situations. MS 28 communicates with BSs 16, 18, 20, and MS 30 communicates with BSs 20, 22. A control link between RNCs 12, 14 permits diversity communications to/from MS 30 via BSs 20, 22.

During soft handovers, terminals receive TPC commands from more than one base station, and methods have been developed for handling conflicts between TPC commands from different base stations. Conflicts are expected because as the user terminal leaves one cell, that cell's base station receives a progressively weaker signal and thus that base station's TPC commands call for more power, and at the same time, the user terminal may be entering a new cell, and the new cell's base station receives a progressively stronger signal and thus the new base station's TPC commands call for less power. In a 3GPP-compliant system, the UE combines TPC commands from reliable downlinks with a logical OR function, which leads to reduced UE transmit power if any of the reliable commands says "DOWN". This is described in Section 5.1.2.2.2.3 of 3GPP TS 25.214 (V5.6.0) Rel. 5 (2003), Physical layer procedures (FDD).

Reliable "OR" TPC combining can be implemented in different ways in a UE, for instance by using reliability thresholds, which are described in N. Wiberg, H. Rong, F. Gunnarsson, and B. Lindoff, "Combining of power control commands during soft handover in WCDMA", *Proc. of the 14th Int'l Symposium on Personal, Indoor and Mobile Radio Communication (PIMRC)*, 2003. Other aspects of TPC are described in U.S. Pat. No. 6,594,499 to A. Andersson et al. for "Downlink Power Control in a Cellular Telecommunications Network".

Soft handover in WCDMA and other 3G communication systems involves an Active Set Update-ADD procedure that is described, for example, at 3GPP TS 25.214 cited above. The UE reports event 1A (Radio Link Addition) to the network and the RNC informs the new base station, node B, to start uplink (UL) synchronization. When an acknowledgement message from the node B is received in the RNC, an "Active Set Update-ADD" message is transmitted to the UE, and simultaneously, the new node B starts to transmit on the downlink (DL). Until UL synchronization is achieved, the TPC commands transmitted by node B on the new DL call for the UE to increase its transmitted power; according to Section 5.1.2.2.1.2 of TS 25.214, the TPC command sequence is . . . 11111 . . . . The, UE receives and decodes the "Active Set Update-ADD" message, and after that the terminal's physical layer starts to combine the DL information, including TPC commands, from node B and the "old" base station, node A.

UL synchronization when entering or adding a link in soft handover can take 100 milliseconds (ms) or even more, depending on channel conditions. This delay is mainly due to node B's having no knowledge of the UE, which forces node B to search over its entire cell, and to the typically low power of node B's received UL signal and the low number of UL DPCCH pilots, which forces a large number of symbols to be used for obtaining reliable channel and path estimates.

In order to reduce this time delay, which contributes to the period during which TPC on the new UL and DL is open-loop, the physical layer (Layer 1) in node B gets Layer-3 information from the RNC to start UL synchronization before the Layer-3 "Active Set Update" message is transmitted to the UE. Although the amount of improvement due to this for node B is not easily calculated, there has been an indication in at least one RNC log of a delay of only 30-40 ms. The UL (node B) has at least two other timing advantages over the DL in establishing sync: the Active Set Update message is itself 20 ms long, and then the UE needs time to process it. The UE's processing time depends on the UE's architecture and on the current load on the real-time processing units in the terminal. A further delay of 30-50 ms might occur in a terminal before the terminal starts to combine the new DL information on Layer 1. The sum of these delays in the DL is about 100 ms, which means that the start of UL synchronization can be expected to occur at least about 100 ms before DL synchronization (sync) occurs. The end of UL sync, however, can occur after the UE has received the active set update message and started to combine power control commands from the new base station. In this situation, there is a risk of control loop problems, in the form of UL power peaks, i.e., too large UL power, or UL power dips, i.e., too low UL power.

Field experiments have shown a phenomenon during soft handovers that is apparently not prevented by current TPC methods. When a terminal or user equipment (UE) enters or adds a communication link in a soft handover, peaks of 20-40 dB in the uplink (UE-to-base) transmitted power can be observed if the initial downlink power on the new link is set too high and if the new node B fails to achieve uplink synchronization within 30-40 ms from the time the UE starts to combine downlink TPC commands (i.e., after receiving and processing the "Active Set Update" message).

Applicants have recognized that TPC on the UL and DL of a new connection in a soft handover may operate open-loop for 100-200 ms due to the time needed for UL synchronization, and such lengthy delays appear to be the main cause of the peaks in the transmitted power. These power peaks are interference to other users, and thus can cause problems for the users and the system as a whole.

Another problem that appears to be caused by delays in synchronization is dips in the UL transmitted power. If a too-low UL power is used, the UL is "killed", which is a connection problem for the UE.

SUMMARY

In one aspect of this invention, there is provided a method when entering or adding a link in soft handover to a new node B of detecting whether the node B has achieved UL synchronization. TPC commands from the new link are not included in a combination of TPC commands until an UL synchronization detector determines that UL synchronization has been achieved. Since in many communication systems, a pattern of TPC commands is transmitted on the new DL as long as the new node B UL is not synchronized, the UL synchronization detector can determine whether synchronization has been achieved by determining whether the TPC command pattern is present in the new DL. In this way, the UL synchronization detector reduces the occurrence and magnitude of unwanted peaks and dips in the UL transmitted power.

In another aspect of Applicants' invention, a terminal in a communication system includes a device that recovers control symbols intended for the terminal, where the control symbols include TPC commands directed to the terminal from at least one transmitting node to which the terminal is connected and at least one node to which the terminal would be simultaneously connected. The terminal also includes a TPC combiner adapted to receive TPC commands from the device and, based on the commands, to generate a combined TPC command that is used for increasing or decreasing a transmit power of the terminal, and an uplink synchronization detector adapted to recognize a TPC command pattern expected to be directed to the terminal from the at least one node to which the terminal would be connected until synchronization is achieved on an uplink channel between the terminal and the at least one node. If the expected TPC command pattern is recognized, the combined TPC command is not based on the TPC commands from the node to which the terminal would be connected.

In another aspect of Applicants' invention, there is provided a method in a communication terminal of reducing peaks and dips in power transmitted in an uplink in a communication system when the terminal enters into or adds a communication link in a soft handover. The method includes the steps of receiving and combining transmit power control (TPC) commands from a number n-1 of communication links; determining whether uplink synchronization has been achieved for a communication link to be added; if uplink synchronization has not been achieved for the communication link to be added, continuing to combine TPC commands from at least some of the n-1 communication links; and if uplink synchronization has been achieved for the communication link to be added, combining TPC commands associated with the communication link to be added with TPC commands from at least some of the n−1 communication links.

In another aspect of Applicants' invention, a computer-readable medium contains a computer program for reducing peaks and dips in power transmitted in an uplink in a communication system when a terminal enters into or adds a communication link in a soft handover. The computer program performs the steps of determining whether uplink synchronization has been achieved for a communication link to be added; if uplink synchronization has not been achieved for the communication link to be added, causing transmit power control (TPC) commands from at least some of the n−1 communication links to be combined; and if uplink synchronization has been achieved for the communication link to be added, causing TPC commands associated with the communication link to be added to be combined with TPC commands from at least some of the n−1 communication links.

BRIEF DESCRIPTION OF THE DRAWINGS

The various features, objects, and advantages of Applicants' invention will be understood by reading this description in conjunction with the drawings, in which.

DETAILED DESCRIPTION

Applicants have recognized that a predictable pattern of TPC commands is transmitted in the DL from a new node B until UL synchronization is achieved in a UE. In a communication system according to the 3GPP specifications, for example, the pattern may be "... 11111 ...", which means "TX power... up, up, up, up, up, ...". Other communication systems can also be expected to have predictable patterns of TPC commands. Hence, a UE can filter the TPC commands from the new link and then use the result as a detector for UL synchronization. As long as the detector signals that the new UL is not synchronized, the TPC commands from that link should not be combined with TPC commands from other links.

Figure 1:
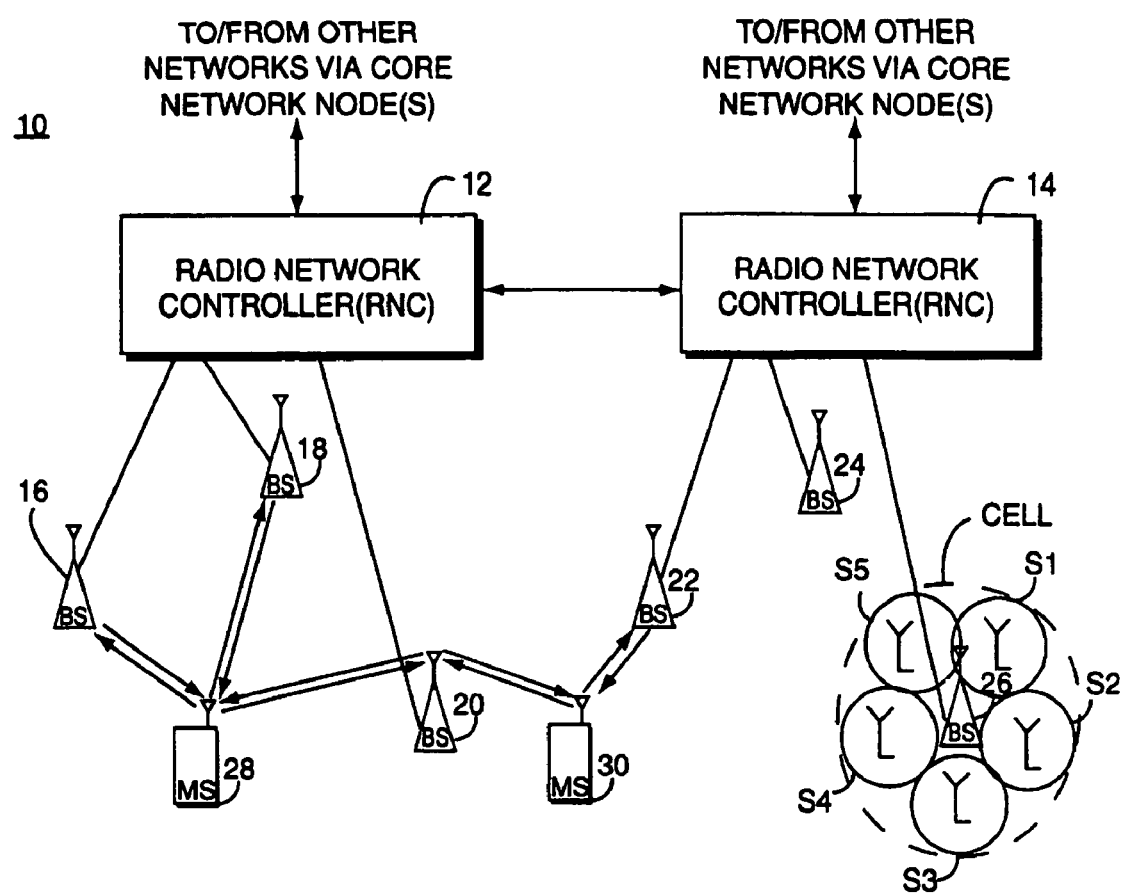
FIG. 1 depicts a communication system.
Figure 2:
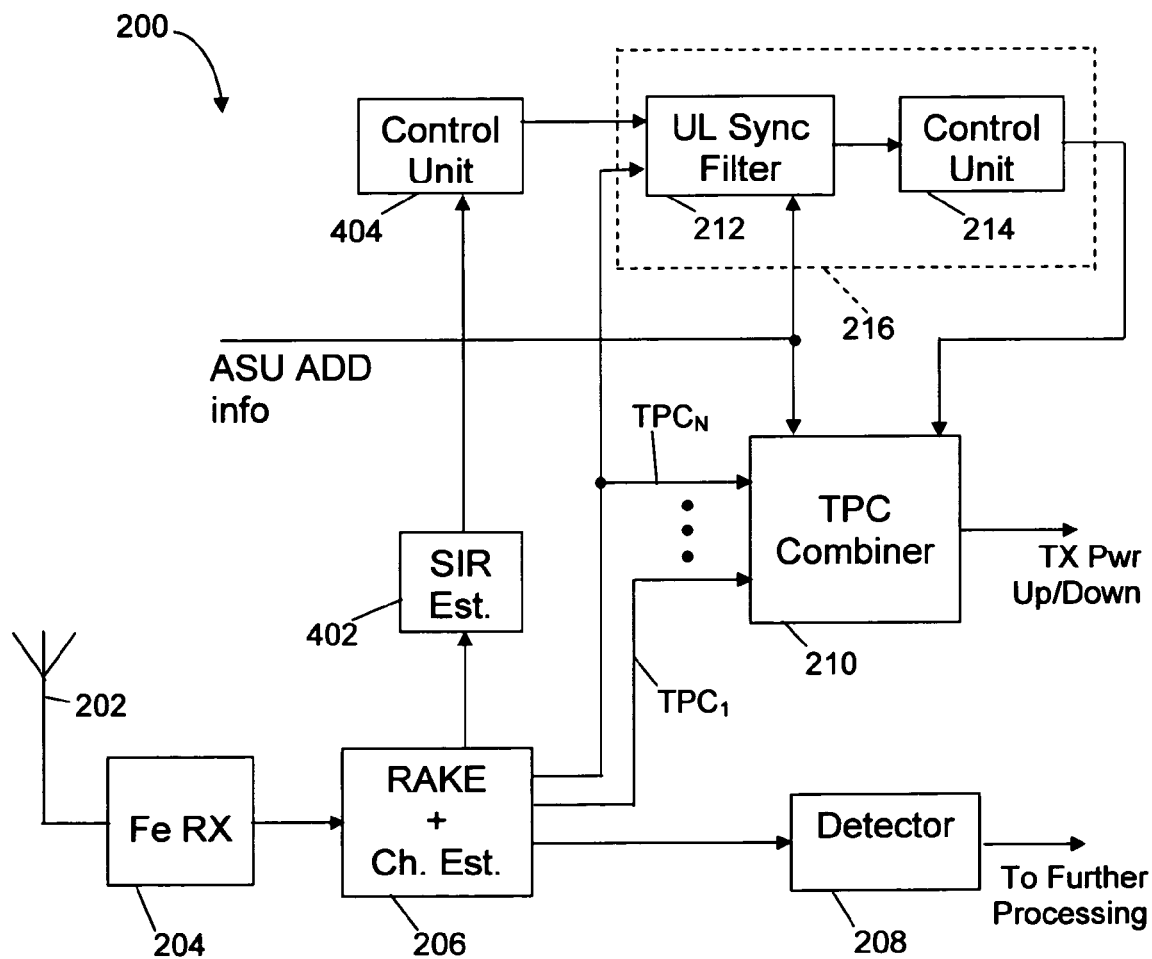
FIG. 2 is a block diagram of a receiver in accordance with Applicants' invention.

FIG. 2 is a block diagram of a receiver 200 in accordance with Applicants' invention. The receiver 200, such as a mobile terminal in a WCDMA communication system, receives radio signals through an antenna 202 and down-converts and samples the received signals in a front-end receiver (Fe RX) 204. The output samples are fed from Fe RX 204 to a rake combiner and channel estimator 206 that de-spreads the pilot channel, estimates the impulse response of the radio channel, and de-spreads and combines received echoes of the received data and control symbols. An output of the combiner/estimator 206 is provided to a symbol detector 208 that produces information that is further processed as appropriate for the particular communication system.

Rake combining and channel estimation are well known in the art. Various aspects of rake receivers are described in G. Turin, "Introduction to Spread-Spectrum Antimultipath Techniques and Their Application to Urban Digital Radio", Proc. IEEE, vol. 68, pp. 328-353 (March 1980); U.S. Pat. No. 5,305,349 to Dent for "Quantized Coherent Rake Receiver"; U.S. Patent Application Publication No. 2001/0028677 by Wang et al. for "Apparatus and Methods for Finger Delay Selection in Rake Receivers"; and U.S. patent application Ser. No. 09/165,647 filed on Oct. 2, 1998, by G. Bottomley for "Method and Apparatus for Interference Cancellation in a Rake Receiver" and Ser. No. 09/344,898 filed on Jun. 25, 1999, by Wang et al. for "Multi-Stage Rake Combining Methods and Apparatus". Channel estimation is described in, for example, U.S. Provisional Patent Application No. 60/519,261 by L. Wilhelmsson for "Channel Estimation by Adaptive Interpolation".

The combiner/estimator 206 also recovers control symbols, including TPC commands from each node, such as a base station, to which the terminal is connected, and feeds TPC command streams $TPC_1$, $TPC_2$, ..., $TPC_N$ to a TPC combiner 210 that detects the TPC commands from each link in the active set. Based on the detected commands, the combiner 210 generates a combined TPC command that is used for increasing or decreasing the terminal's transmit power. If there is only one link in the active set, the combined TPC command is just the one detected TPC command stream for that particular link. Several methods of determining and of combining TPC commands are known, such as those described in U.S. patent application Ser. No. 10/445,759 by Nilsson et al. for "Methods, Receivers, and Computer Program Product for Determining Transmission Power Control Commands Using Biased Interpretation".

From time to time, the terminal 200 may receive an Active Set Update-ADD (ASU ADD) message from higher signaling layers (Layer 3, or L3), stating that the terminal should start to listen and combine a new downlink. In other words, the terminal goes into soft handover (SHO) if the number of links becomes N=2 or adds a link in SHO if the number of links is N>2. As seen in FIG. 2, the L3 information is fed to the combiner/estimator 206 that starts to receive and de-spread the DL from the new node B and also to the TPC combiner 210 that prepares to detect the TPC command stream from the new DL. It is important to note that the new DL's TPC commands are not included in the combiner 210's TPC combination.

As seen in FIG. 2, the L3 ASU ADD information is also transmitted to a UL synchronization filter 212, which is a filter adapted to the TPC command pattern expected from the new node B until UL synchronization is achieved. The filtered detected TPC commands from the new link are fed to a control unit 214 that decides based on the filtered commands whether UL synchronization has been achieved or not. As indicated by the dashed lines, the filter 212 and control unit 214 in the exemplary embodiment depicted in FIG. 2 may be considered an UL sync detector 216. As long as it is determined that UL sync has not been achieved, the TPC combination implemented by the combiner 210 includes only the N−1 "old" links; when the control unit 214 determines that UL sync has been achieved, the control unit provides a suitable signal to the combiner 210. In response to the signal from the control unit 214, the combiner 210 starts to include the TPC commands from the new link in its TPC combination. It will be appreciated, of course, that the presence or absence of a signal from the control unit 214 as an indication of synchronization or not is merely a matter of design choice. Accordingly, the risk of UL power peaks when entering or adding a link in SHO is reduced.

Figure 3:
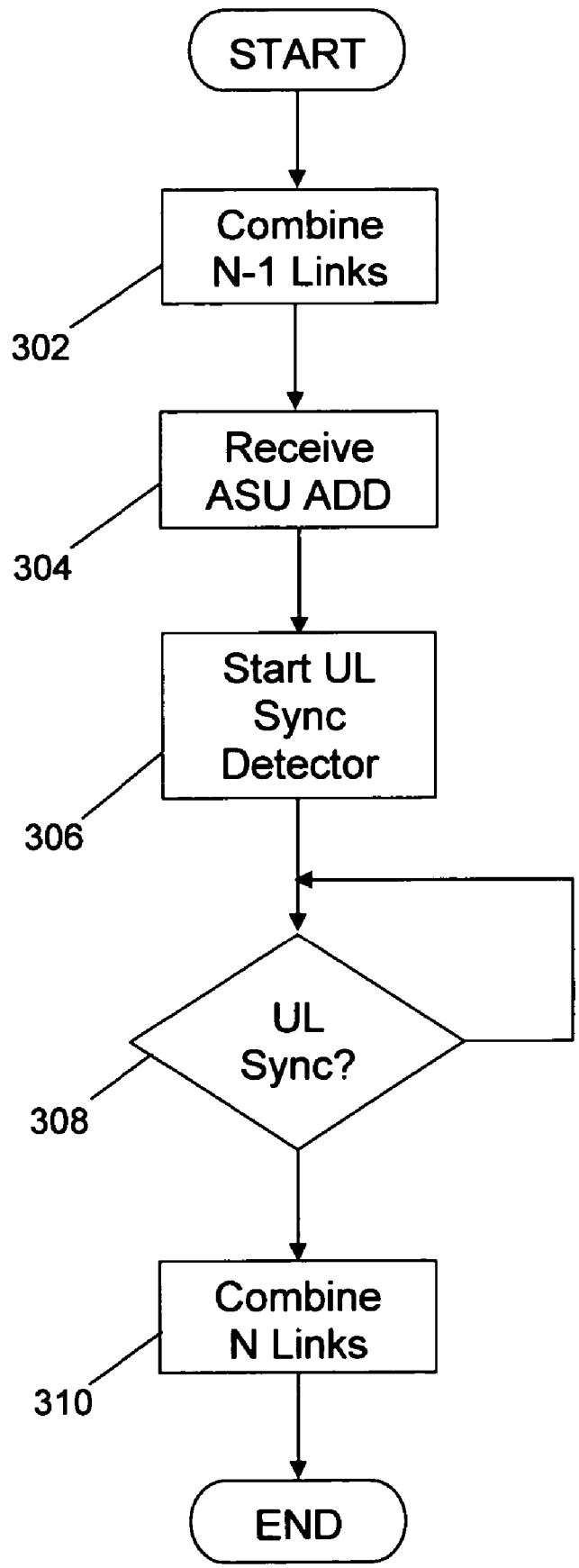
FIG. 3 is a flow chart of a method in accordance with Applicants' invention.

FIG. 3 is a flow chart of a method in accordance with Applicants' invention. In an initial condition, TPC commands from a number N−1 of links may be received and combined (block 302). A message, such as an ASU ADD message, is received (block 304), and an UL synchronization detector for the to-be-added link is started or enabled (block 306). In block 308, a decision is made whether UL sync has been detected; if not, the process flow loops back so the decision is made again with a suitable time lapse, e.g., two time slots. If the decision indicates that UL sync has been detected, the process flow moves on such that TPC command streams from N links are combined (block 310).

It will be appreciated that the synchronization filter 212 is a matched filter in that it is adapted to an expected TPC command pattern, and thus the filter 212 can have any of the many forms available for matched filters. For example, the filter 212 may include a correlator that compares the TPC command stream to a copy of the expected command stream. Such a filter might be conveniently implemented in program steps executed by a processor in the receiver 200 or even by circuits employed by the combiner/estimator 206.

In another form of UL sync detector, the synchronization filter 212 can include an accumulator and the control unit 214 can include a threshold device that operate in the following way. According to the 3GPP specification, the DL TPC commands may be "1", i.e., "up", until the new UL has achieved radio link synchronization. The accumulator thus can form the sum, or an indication of the sum, of a number M of TPC commands, and the control unit can implement a comparator that compares the sum or its indication to a threshold. As long as the sum is close to M (say, sum>M-L), the threshold device does not (or does) provide a signal to the combiner 210 to indicate that the new UL has not achieved synchronization. The quantity M-L is a threshold that can be set in any suitable way (e.g., by software executed by the control unit), and the values of M and L are chosen based on a trade-off between TPC detection error rate and missed detection.

Assuming a TPC detection error rate (worst case) of 15%, it is currently believed that M=15 (i.e., 15 "up" commands) and L=4 may be good choices, but it will be appreciated that other values may also be chosen. The synchronization filter may then be described by:

$$x_t = \sum_{k=0}^{14} TPC_{t-k}$$

where $x_t$ is the output of the accumulator and $TPC_{t-k}$ are estimates of the TPC commands (e.g., ±1) for the new link at times t-k. The accumulator (filter) is initialized to zero and started at time $t=t_0$, where $t_0$ is the time the ASU ADD information is known to the receiver. Furthermore, as a threshold device, one can use the following logical decision criterion:

UL sync is achieved if $x_{t-1} \geq 11$ and $x_t < 11$

If the criterion is so, the accumulator can be turned off and the new TPC commands included in the TPC combination.

Figure 4A:
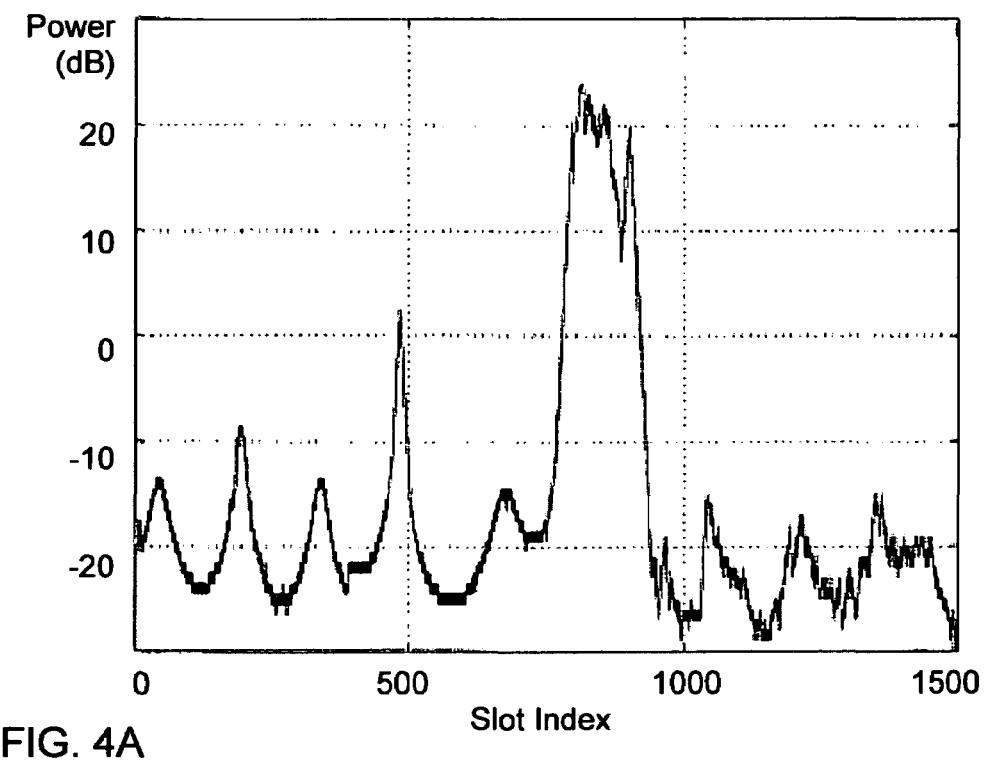
FIGS. 4A and 4B show simulated UE transmitted power in a range of slots without and with uplink synchronization detection, respectively.
Figure 4B:
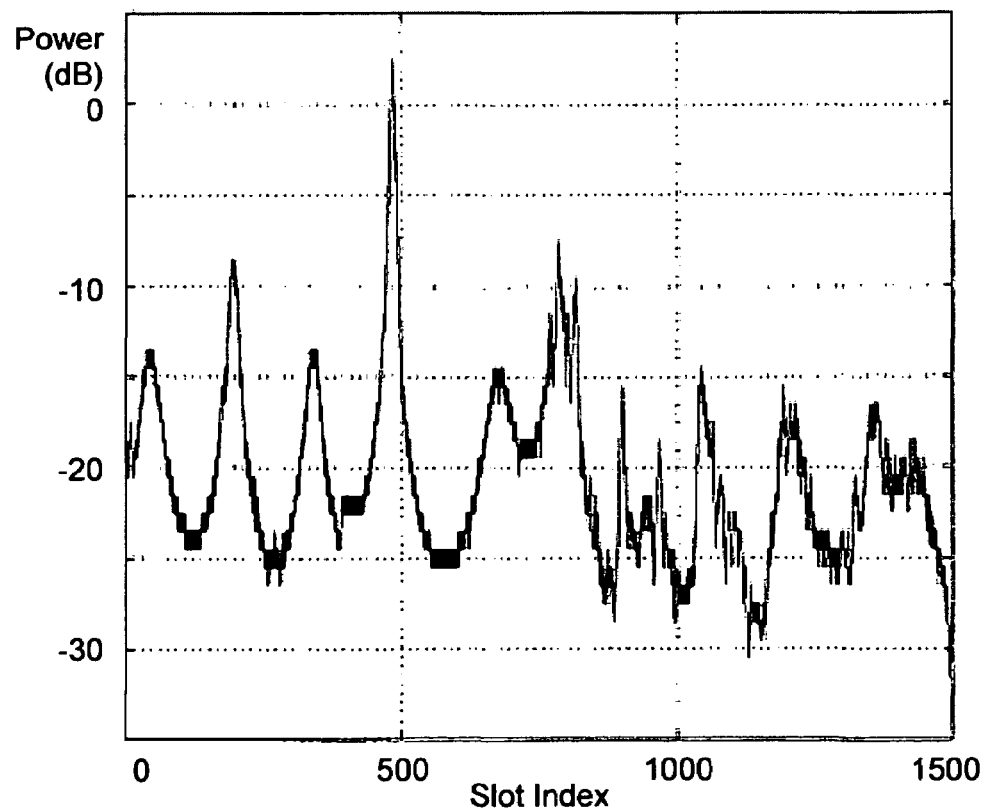

FIGS. 4A and 4B show the results of a simulation, in which a one-path, 3-km/hr, Rayleigh-fading channel is assumed, a new link is added at slot number 750 (i.e., an ASU ADD message is received and processed at slot number 750), and UL synchronization is achieved at slot number 900 (i.e., DL power control is started on the new link). FIG. 4A shows the simulation results when the TPC commands for the new link are used in the TPC combination directly after TPC ADD is processed; in other words, FIG. 4A depicts prior art techniques. FIG. 4B shows the simulation results when the new link's commands are included in the TPC combination only after a UL synchronization detector determines that the UL is in sync. As can be seen from a comparison of FIGS. 4A and 4B, the UL peak during the open-loop time (slot numbers 750-900) is reduced by about 30 dB, from a level of about 20 dB to a level of about −10 dB.

As noted above and as described in U.S. patent application Ser. No. 10/445,759 cited above, the DL TPC pattern sent by a node, such as a node B, to the UE for control of UL power can be different in different networks. For example, even if the 3GPP specification indicates that an all-up TPC pattern should be used, a network may instead send a toggling pattern, i.e., a sequence of (up-down) pairs that may include "extra" up commands now and then. Toggling patterns are discussed in Section 5.1.2.2.1.2 of 3GPP TS 25.214. Such a toggling pattern can be a problem for the UE, resulting in a decreasing UL power and eventually a "killed" UL, i.e., a too-low UL transmit power. Toggling patterns have been popular in some networks, despite their contribution to the problem of dropped calls in some cases, and such toggling patterns may continue to be used in the future. Like an all-up pattern, a toggling pattern can be detected by the UE and appropriate action taken, which will result in a proper setting of UL power and a continued call. In this situation, proper setting of the UL power occurs when the TPC commands from the link that has been detected to be open-loop are not combined with TPC commands from other links that are closed-loop.

As above, let +1 denote an up command and −1 denote a down command, and let x(k) denote DL TPC commands (that control the UL power) from a node B, where k is a time index (e.g., a time slot). It may be noted that in a 3GPP network, x(k)x(k−1)=−1 if the two commands are different and +1 otherwise.

A toggling sequence of TPC commands is detectable by forming a detection signal, which can be denoted by d(k), where d(k)=x(k)x(k−1), and smoothing the detection signal with a low-pass filter. A low-pass filter can be conveniently implemented in software according to the following expression:

$$df(k)=\alpha df(k-1)+(1-\alpha)d(k)$$

in which α is the time constant of the filter. It is currently believed that a typical value of the time constant is α=0.99. The value of the filtered detection signal df(k) will be around zero if the uplink is in sync, and will take on negative values when a toggling pattern starts, with a response determined by the time constant α. A threshold is therefore set, e.g., df(k) $\geq$ −0.4, and when df(k) crosses the threshold, loss of UL sync and use of a toggling pattern are detected; the UL is considered in sync if df(k)>−0.4.

It will be understood that threshold values for the in-sync/out-of-sync transition can be used that differ from −0.4 and that the signal values need not be in a range of +1 to −1 as described. Moreover, it will be recognized that this form of processing can be considered a kind of matched filtering, and thus forming the detection signal d(k) and low-pass filtering it can be carried out by the UL sync filter 212 and comparing the filtered detection signal df(k) to a threshold and generating an indication of the outcome of the comparison can be carried out by the control unit 214, whether these functionalities are implemented in logic and circuitry or in software executed by a suitable processor.

Figure 5A:
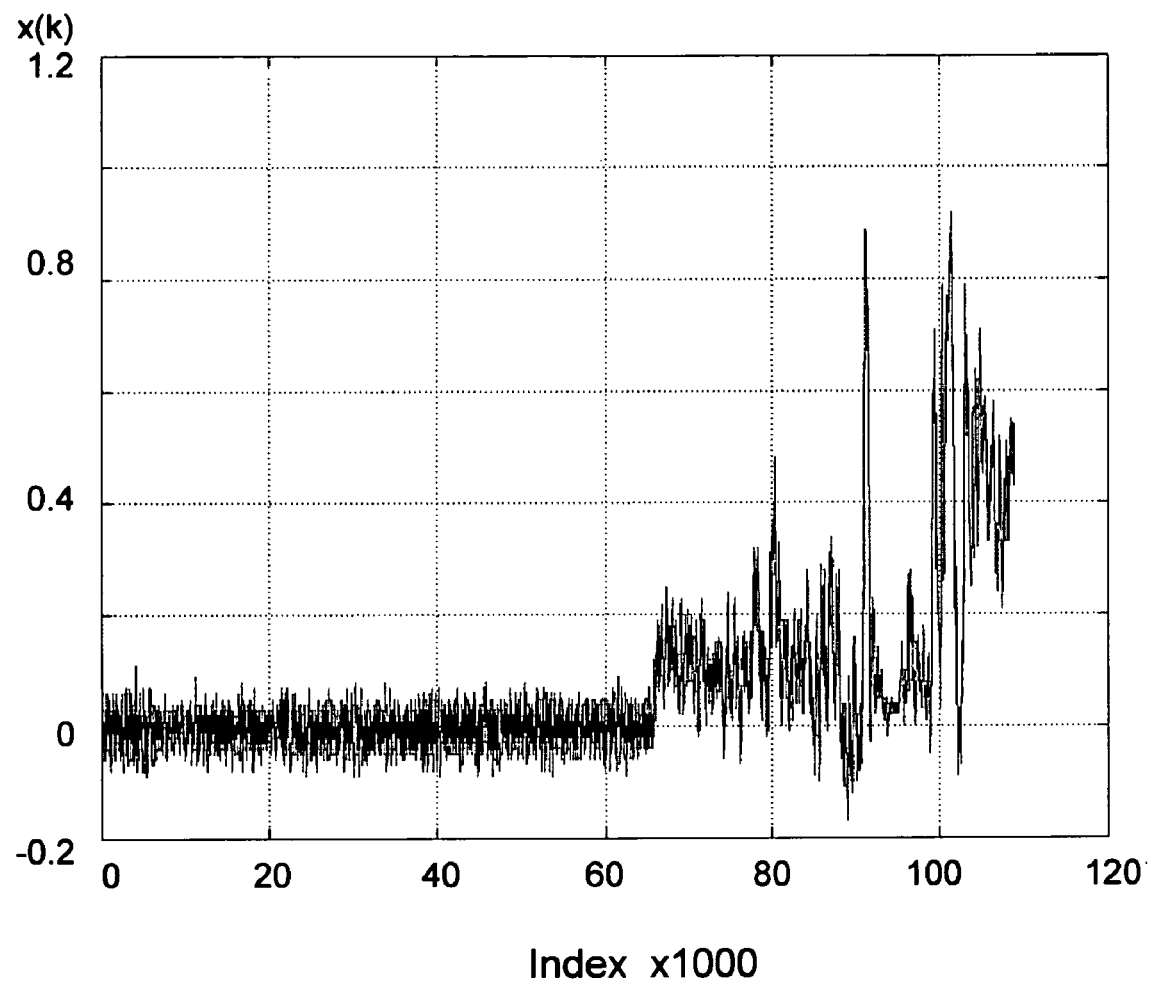
FIGS. 5A and 5B depict field measurements by a TPC command sequence detector.
Figure 5B:
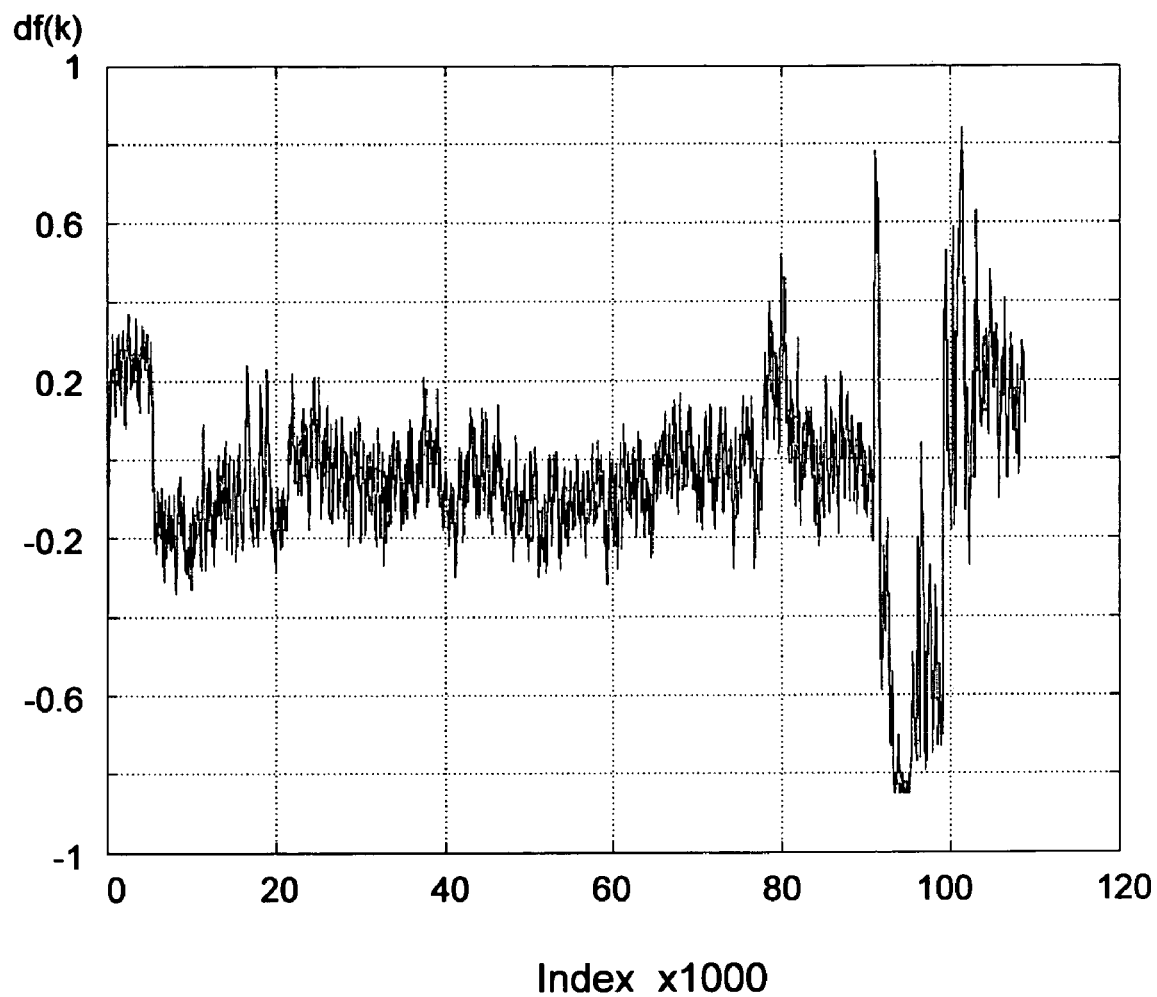

Such a toggling detector has been constructed and tried out in the field with measurement results depicted in FIGS. 5A and 5B. The trace in FIG. 5A indicates (filtered) TPC commands x(k) sent on the DL, and the trace in FIG. 5B indicates the filtered detection signal df(k). From FIG. 5B, it can be seen that uplink sync is lost at time index k=90,000. By detecting the loss of UL sync, the UE detects that node B is sending a toggling pattern of TPC commands that can "kill" its UL, and the UE can exclude from or reduce its use of those TPC commands in TPC combining.

To the extent that Applicants' TPC command sequence detectors are matched filters, it is necessary for the UE to know which matched filter to use, i.e., which sequence of TPC commands is expected. As described above, common sequences are all-up and toggling. The UE can be informed of which sequence to expect in a number of ways, for example, by inclusion of a suitable information element in network description messages that may be sent during registration and authentication of the UE, although such inclusion is not necessary. A UE could process TPC commands with several different matched filters simultaneously, or even serially, and act according to the filter having a response.

Since UL power peaks are mainly seen when the new DL power is set too high as described above, it can be advantageous to activate an UL sync detector only in such cases. Referring again to FIG. 2, the receiver 200 may include a SIR estimator 402 and a control unit 404 that can be used to check whether this is the case, i.e., whether an UL sync detector is needed. The SIR estimator 402 receives information from the combiner/estimator 206 that is suitable for estimating the combined DL SIR. The estimator 402 provides the SIR estimates to a control unit 404, which generates a UL sync detector ON/OFF signal based on the SIR information as described below, and provides the on/off control signal to the UL sync filter 212.

Let $SIR_t$ represent the received combined SIR after combination of n−1 links at a time t before an ASU ADD message is received. Also let an ASU ADD message be received at a time t+1, and let the received combined SIR of the N links (i.e., the SIR including the new link) be represented by $SIR_{t+1}$.

If $SIR_{t+1} \gg SIR_t$, it is probable that the new SIR from the new DL is very large and the UL sync filter can be started, which is to say that TPC commands from the new link are not included until UL sync has been detected. Accordingly, the control unit 404 provides an ON signal to the UL sync filter 212. If on the other hand, $SIR_{t+1} < SIR_t$, it is probable that the new SIR from the new DL is at an acceptable level, and TPC commands from the new link can be included. Accordingly, the control unit 404 provides an OFF signal to the filter 212. Since the SIR estimates can be noisy, it will be appreciated that control unit 404 might need to take ON/OFF decisions based on filtered versions of the SIR estimates.

Methods of estimating SIRs are well known in the art. The signal power S and the interference power I are usually estimated using pilot symbols, i.e., known symbols transmitted on one or more channels. SIR estimation is described for example in U.S. patent application Ser. No. 10/700,855 by J. Nilsson et al. for "Interference Estimation in CDMA Systems Using Alternative Scrambling Codes", which is incorporated here by reference.

It has also been observed in field trials that there is a non-zero risk that a link in a SHO goes out of sync (OoS) after the link has been in sync. If this happens, the link would usually be resynchronized in a procedure that is the same as the procedure in the initial sync case, and hence there will be a risk for large UL transmit power peaks or dips. Therefore, it can be useful for a receiver to detect whether an UL in SHO is OoS and, if such UL OoS is detected, to employ the UL sync detector described above. Such OoS detection is described in U.S. patent application Ser. No. 10/840518 by B. Lindoff et al. for "Methods and Apparatus for Fast Downlink Information of Uplink Out of Synchronization" that was filed on the same day as this application.

Another way to detect UL OoS is to run the OoS filter during, or in parallel with, the data reception after the first link in a SHO is in sync. The parameters of the OoS filters are adjusted to longer filter lengths and the like because detection in this situation is more difficult than initial sync detection. When the output of a filter corresponding to a particular DL exceeds an OoS threshold, TPC commands from that DL are excluded or from or limited in the TPC combination. It will be appreciated that although FIG. 2 depicts one OoS filter 216, a plurality of such filters may be provided.

It will be appreciated that procedures described above are carried out repetitively as necessary, for example, to respond to time-varying characteristics of communication channels between transmitters and a receiver. To facilitate understanding, many aspects of Applicants' invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, Applicants' invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A terminal in a communication system, comprising:
    a device that recovers control symbols intended for the terminal, wherein the control symbols include transmit power control (TPC) commands directed to the terminal from at least one transmitting node to which the terminal is connected and at least one node to which the terminal would be simultaneously connected;
    a TPC combiner adapted to receive TPC commands from the device and, based on the commands, to generate a combined TPC command that is used for increasing or decreasing a transmit power of the terminal; and
    an uplink synchronization detector adapted to recognize a TPC command pattern expected to be directed to the terminal from the at least one node to which the terminal would be connected until synchronization is achieved on an uplink channel between the terminal and the at least one node to which the terminal would be connected;
    wherein the combined TPC command is not based on the TPC commands from the at least one node to which the terminal would be connected if the expected TPC command pattern is recognized in those TPC commands.

2. The terminal of claim 1, wherein the uplink synchronization detector is enabled in response to a predetermined message directed to the terminal.

3. The terminal of claim 2, wherein the uplink synchronization detector comprises a filter matched to the expected TPC command pattern and a control unit that determines, based on an output of the filter, whether uplink synchronization has been achieved and that provides a corresponding signal to the TPC combiner.

4. The terminal of claim 2, wherein the uplink synchronization detector includes a filter and a threshold device; the filter accumulates a plurality of TPC commands and generates an output signal based on the accumulated commands; and the threshold device compares the filter's output signal to a threshold and generates, based on the output signal, an indication whether uplink synchronization has been achieved.

5. The terminal of claim 2, wherein the uplink synchronization detector includes a filter and a threshold device; the filter smoothes a detection signal based on a plurality of TPC commands and generates an output signal based on the detection signal; and the threshold device compares the filter's output signal to a threshold and generates, based on the output signal, an indication whether uplink synchronization has been achieved.

6. The terminal of claim 1, wherein the uplink synchronization detector is enabled when a downlink power from the at least one node to which the terminal would be connected exceeds a predetermined level.

7. The terminal of claim 6, further comprising a signal to interference ratio (SIR) estimator and a second control unit, wherein the SIR estimator generates estimates of the SIR on the downlink from the at least one node to which the terminal would be connected, and the second control unit generates an ON/OFF signal for the uplink synchronization detector based on the SIR estimates.

8. The terminal of claim 7, further comprising a filter that smoothes the SIR estimates.

9. The terminal of claim 1, wherein the TPC command pattern is expected to be directed to the terminal from the at least one node to which the terminal would be connected until re-synchronization is achieved on the uplink channel between the terminal and the at least one node.

10. The terminal of claim 1, wherein the device comprises a rake receiver.

11. The terminal of claim 1, wherein the terminal is a mobile telephone.

12. A method in a communication terminal of reducing peaks and dips in power transmitted in an uplink in a communication system when the terminal enters into or adds a communication link in a soft handover, comprising the steps of:
  receiving and combining transmit power control (TPC) commands from a number n−1 of communication links, wherein n is greater than one;
  determining whether uplink synchronization has been achieved for a communication link to be added;
  if uplink synchronization has not been achieved for the communication link to be added, continuing to combine TPC commands from at least some of the n−1 communication links; and
  if uplink synchronization has been achieved for the communication link to be added, combining TPC commands associated with the communication link to be added with TPC commands from at least some of the n−1 communication links.

13. The method of claim 12, wherein the determining step includes the step of filtering TPC commands associated with the communication link to be added and is carried out in response to a predetermined message received by the terminal.

14. The method of claim 13, wherein the filtering step includes the step of recognizing a pattern of TPC commands associated with the communication link to be added.

15. The method of claim 12, wherein the determining step includes the steps of accumulating a plurality of TPC commands associated with the communication link to be added; generating an output signal based on the accumulated commands; and comparing the output signal to a threshold value.

16. The method of claim 12, wherein the determining step includes the steps of forming a detection signal based on a plurality of TPC commands associated with the communication link to be added, smoothing the detection signal, generating an output signal based on the smoothed detection signal; and comparing the output signal to a threshold value.

17. The method of claim 12, further comprising the step of estimating a signal to interference ratio (SIR) on the downlink from the at least one node to which the terminal would be connected, wherein the determining step is carried out based on the estimated SIR.

18. The method of claim 17, further comprising the step of smoothing the estimated SIR.

19. The method of claim 12, wherein the determining step includes determining whether uplink synchronization has been achieved for a communication link to be re-synchronized; if uplink synchronization has not been achieved for the communication link to be re-synchronized, continuing to combine TPC commands from at least some of the n−1 communication links; and if uplink synchronization has been achieved for the communication link to be re-synchronized, combining TPC commands associated with the communication link to be re-synchronized with TPC commands from at least some of the n−1 communication links.

20. The method of claim 12, wherein the terminal is a mobile telephone.

21. A computer-readable medium containing a computer program for reducing peaks and dips in power transmitted in an uplink in a communication system when a terminal enters into or adds a communication link in a soft handover, wherein the computer program, when executed by a computer, causes the computer to perform the steps of:
  determining whether uplink synchronization has been achieved for a communication link to be added;
  if uplink synchronization has not been achieved for the communication link to be added, causing transmit power control (TPC) commands from at least some of a number n−1 communication links to be combined, wherein n is greater than one; and
  if uplink synchronization has been achieved for the communication link to be added, causing TPC commands associated with the communication link to be added to be combined with TPC commands from at least some of the n−1 communication links.

22. The computer-readable medium of claim 21, wherein whether uplink synchronization has been achieved is determined by filtering TPC commands associated with the communication link to be added in response to a predetermined message received by the terminal.

23. The computer-readable medium of claim 22, wherein TPC commands are filtered by recognizing a pattern of TPC commands associated with the communication link to be added.

* * * * *

UNITED STATES PATENT AND TRADEMARK OFFICE
CERTIFICATE OF CORRECTION

PATENT NO. : 7,437,175 B2 Page 1 of 1
APPLICATION NO. : 10/839926
DATED : October 14, 2008
INVENTOR(S) : Lindoff et al.

It is certified that error appears in the above-identified patent and that said Letters Patent is hereby corrected as shown below:

On the Title Page Item (56), under "U.S. PATENT DOCUMENTS", Line 14, delete "Katsuri et al." and insert -- Kasturi et al. --, therefor.

In Column 8, Lines 13-14, delete "$df(k) \geqq -0.4$," and insert -- $df(k) \leqq -0.4$, --, therefor.

Signed and Sealed this

Thirty-first Day of March, 2009

JOHN DOLL
*Acting Director of the United States Patent and Trademark Office*